H. A. ADAMS.
HARVESTER-REEL.
No. 191,632. Patented June 5, 1877.
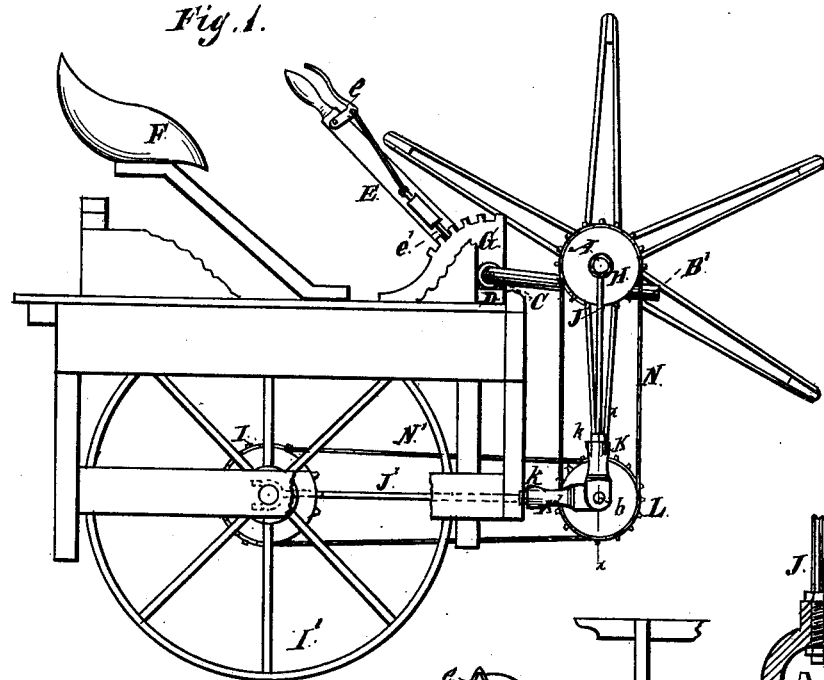
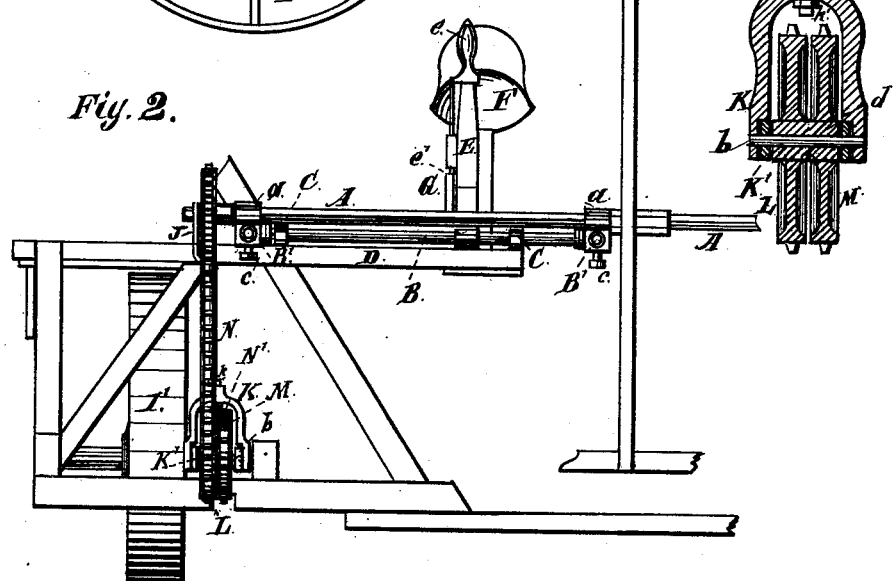
Witnesses:
Heinrich F. Bruns
S. A. Bunting
Henry A. Adams,
Inventor.
By Coburn & Thacher
Attys.

UNITED STATES PATENT OFFICE.

HENRY A. ADAMS, OF SANDWICH, ILLINOIS.

IMPROVEMENT IN HARVESTER-REELS.

Specification forming part of Letters Patent No. 191,632, dated June 5, 1877; application filed December 3, 1875.

*To all whom it may concern:*

Be it known that I, HENRY A. ADAMS, of Sandwich, in the county of De Kalb and State of Illinois, have invented a new and useful Improvement in Harvester-Reels, which is fully described in the following specification, reference being had to the accompanying drawings, in which—

Figure 1 represents a side view of the reel, reel-support, and driving mechanism. Fig. 2 represents a front view of the reel and reel-support; and Fig. 3 represents a sectional view of a portion of the driving mechanism, taken on the line $x$ $x$, Fig. 1.

The invention consists in various devices and combinations of devices, as will be hereinafter more fully set forth.

My invention is intended for use with what is known as the "overhung" reel—that is, one supported at one end only.

In the drawings, A represents the reel-shaft, which is supported in bearings $a$ $a$ on the arms B' B' of the vibrating frame B. This frame is made of gas-pipe or any other suitable metallic tubing, and is in the form of three sides of a rectangle. The side B is supported in bearings C, which are firmly secured to a portion, D, of the frame of the machine. The piece B turns freely in its bearings C, and the arms or projections B' extend forward from the portion B, and support the reel.

A lever, E, is rigidly attached to the part B between the bearings of the latter, and by moving this lever back and forth this piece B is turned in its bearings, and the arms B' B' are thrown up and down, and thus the reel is raised and lowered. The lever E is arranged so as to be easily reached by the driver sitting in the seat F. A toothed segment, G, is firmly attached to the frame by the side of the lever; and upon the lever E is a small sliding stop or pawl, $e'$, which is connected by a link to a small stop-lever, $e$, pivoted to the upper end of the lever E. The stop $e'$ engages with the notches of the segment G, and thus holds the lever E and vibrating frame in any desired position, but at the same time is quickly disengaged, so as to change the position of the reel at the will of the driver.

The bearings $a$ are fitted upon the arms B' B' loosely, so that they may be moved backward and forward thereon, and by changing the position of these bearings the reel may be set forward or back, as the condition of the grain may require. Set-screws $c$ pass through the under side of the bearings $a$, and serve to secure the latter in the position in which they may be placed. Upon the outer end of the reel-shaft is fixed a sprocket-wheel, H, and to the inside of the driving-wheel of the machine is fixed another sprocket-wheel, I, so as to turn with the drive-wheel I'. Upon the outer end of the reel-shaft, outside of the sprocket-wheel, is loosely hung a rod, J, and a similar rod, J', is also loosely attached, in any suitable way, to either the hub of the drive-wheel or the main axle. In the drawing it is shown supported by a forked or semicircular bearing upon the hub on the inner side of the drive-wheel.

Upon the other ends of the rods screw-threads are cut, and to them are attached, by means of the screw-threads, forked pieces K K'. The ends of the forked pieces are cut away so as to form a lap-joint, and they are hinged together by means of a pin, $b$, passing through them. Upon this pin are also placed sprocket-wheels L M, so as to be inclosed and protected by the forked pieces K K'. These wheels L M are rigidly attached to the same hub, $d$, which turns freely upon the pin $b$.

A sprocket-chain, N, extends from the wheel H to the wheel L, and a similar chain, N', from the sprocket-wheel I on the drive-wheel to the wheel M. It will thus be seen that the revolution of the driving-wheel will rotate the sprocket-wheel M, which, being on the same hub, also turns the wheel L, and thus motion is communicated, through the chain N, to the sprocket-wheel H and the reel.

The forked pieces K K' are held in place upon the rods J J' by means of threaded nuts $k$ and $k'$, and by the same means they may be adjusted to obtain the proper tension of the chains for driving the reel. The nuts $k'$ may, however, be dispensed with.

The hinged support for the sprocket-wheels L M, formed by pivoting together the rods J J', permits the driving mechanism of the reel to accommodate itself to the motions of the latter, wherever it is raised or lowered, without changing the relative position of the sprocket-wheels, thus permitting the adjustment of the reel heretofore described without necessitating any adjustment of the driving mechanism.

I have shown my invention arranged to be applied to a harvester in which the grain is elevated and carried over the driving-wheel to binders on the machine; but it is evident that it may be applied to any other harvesting-machine by such slight changes as will adapt it to its new location.

I have described the vibrating frame as constructed from tubular rods; but it is evident that this is not necessary to my invention, and therefore I do not limit myself to a tubular frame.

I have also described and shown a driving mechanism consisting of sprocket wheels and chains, but ordinary bands and sheaves may be used instead.

Having thus described my invention, what I claim as new, and desire to secure by Letters Patent, is—

The combination of the reel-supporting frame B, hinged to the carrying-frame of the machine, so as to vibrate in a vertical direction, the reel-shaft mounted thereon, a sprocket-wheel on the reel-shaft, a main or driving sprocket-wheel, I, a hinged swinging frame, J J', the sprocket-wheels L M, supported in the swinging frame, and the drive-chains N N', substantially as and for the purpose set forth.

HENRY A. ADAMS.

In presence of—
J. P. ADAMS,
S. B. STINSON.